Oct. 26, 1943.    C. W. MOTT    2,332,741
POWER LIFT DEVICE
Filed Oct. 25, 1941    2 Sheets-Sheet 1
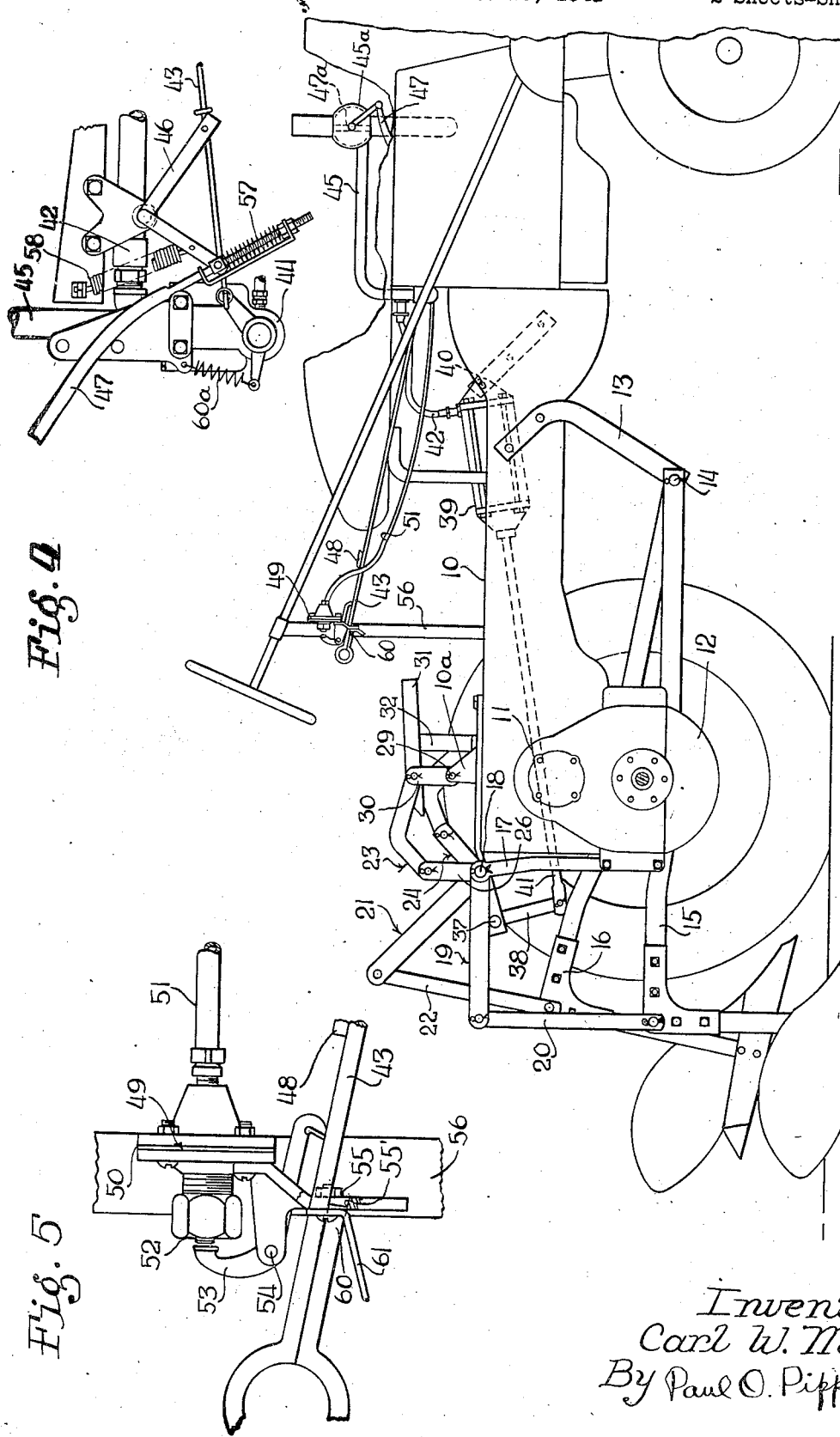
Inventor
Carl W. Mott
By Paul O. Pippel
Atty.

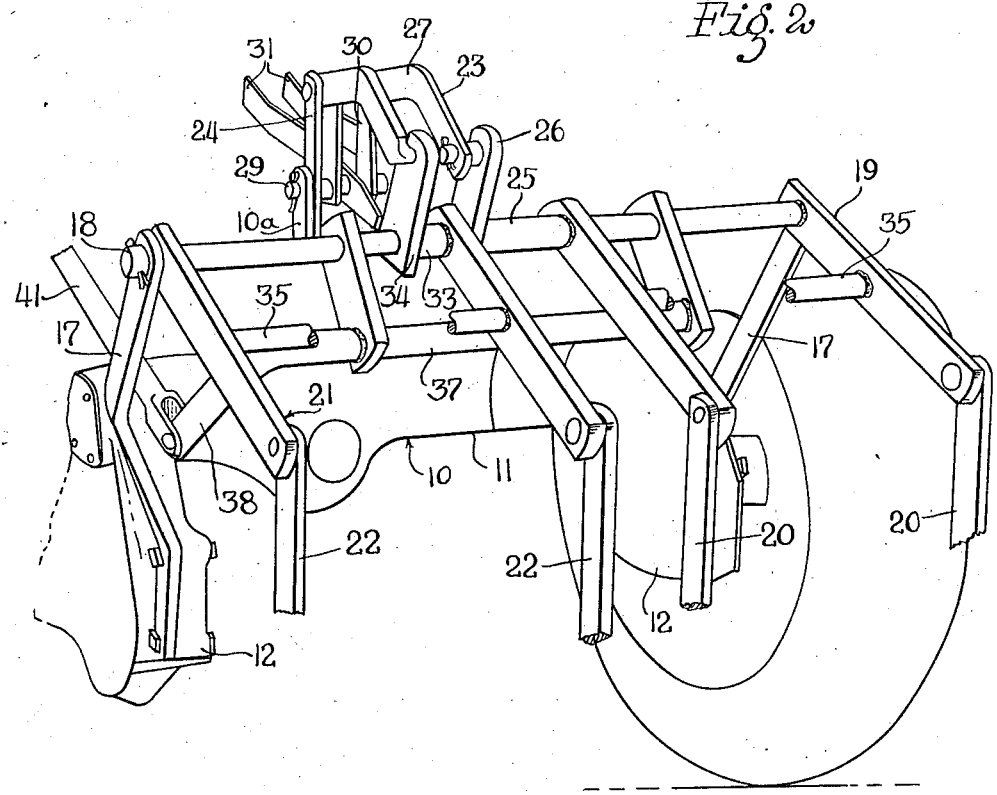
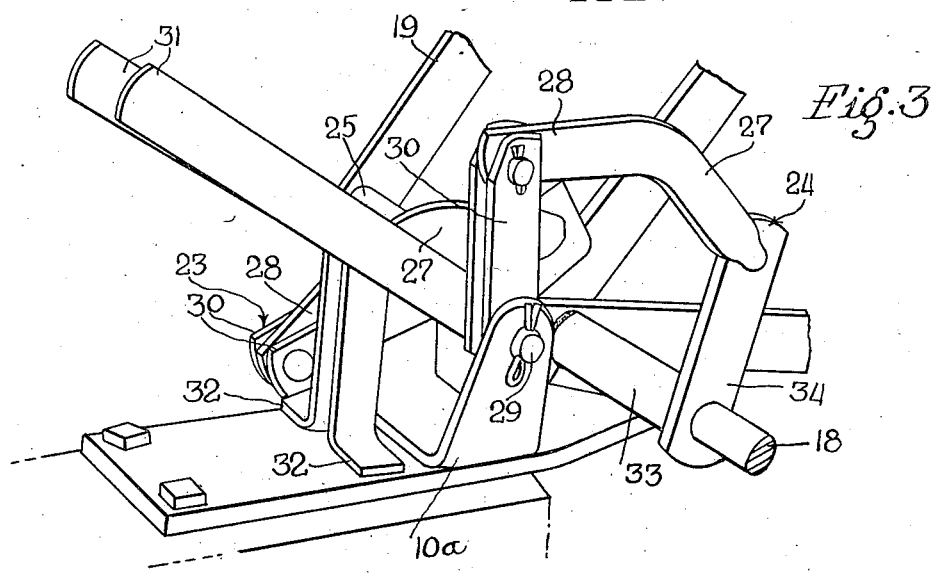

Patented Oct. 26, 1943

2,332,741

UNITED STATES PATENT OFFICE 2,332,741

POWER LIFT DEVICE

Carl W. Mott, La Grange, Ill., assignor to International Harvester Company, a corporation of New Jersey Application October 25, 1941, Serial No. 416,556

6 Claims. (Cl. 97—50)

This invention relates to power lift devices and to vertically moving working tools, such as plow bottoms, directly connected to the tractor for vertical movement.

It is an object of the present invention to provide a fluid-actuated power lift device particularly adaptable for lifting two-way, right- and left-hand plows connected to the tractor for alternate operation, wherein the fluid-actuated lift device, after it has performed work for the lifting of either one or both of the plow bottoms to a transport position, will be automatically relieved of its lifting fluid and will not need to be evacuated at the time when the plow bottoms are dropped to their working position.

It is another object to provide in an exhaust fluid system, which serves for lifting implements to their transport position, means for automatically releasing the exhaust fluid from the fluid-actuated device at the end of the lifting stroke.

According to the present invention, the control mechanism for fluid-actuated devices, such as disclosed in my pending application, Serial No. 407,559, filed August 20, 1941, has been adapted for use in the lifting of right- and left-hand plow bottoms connected to a tractor or tool-supporting structure for alternate operation. The control mechanism has been so altered that fluid is not retained in the fluid-actuated cylinder at the end of its working stroke. The biasing spring, which retains the control element of the control mechanism against the stop, is allowed to effect a complete return movement of the control element so that the fluid, instead of being retained in the fluid-actuated device, will be at that time automatically released therefrom. Toggle latch devices serve to retain the plow bottoms in their transport position, and, since the lifting fluid is released from the fluid-actuated cylinder device at the time of lifting, the plow bottoms are free to be dropped to their plowing position without being delayed by the lifting fluid.

For a better understanding of the invention, reference may be had to the following detailed description taken in connection with the accompanying drawings, in which:

Figure 1 is a side view in elevation of the tractor and of a two-way plow with lifting mechanism therefor, embodying the features of the present invention, connected to the tractor;

Figure 2 is a rear perspective view of a portion of the tractor and of the lifting structure carried by the rear axle of the tractor;

Figure 3 is a perspective view of the toggle-locking devices for the respective plow bottoms;

Figure 4 is a detail view of the control mechanism for causing diversion of the exhaust fluid for delivery to the fluid-actuated device; and Figure 5 is a detail view of the fluid release means and of the guiding plate which permits complete return of the control element upon the same being released.

Referring now particularly to Figures 1 and 2, there is shown a tractor 10 having a rear axle structure 11 including depending axle housings 12. Connected to the tractor forwardly of the rear axle structure is a draft bracket 13 to which is pivotally connected, as indicated at 14, the right-hand and left-hand plowing units 15 and 16. Each plowing unit includes a beam structure which extends rearwardly underneath the rear axle structure of the tractor to a location in the rear thereof and on the rear end of which is connected a plow bottom. On each of the depending axle structures 12, at opposite sides of the tractor, there is connected a vertically extending bracket 17 between which there is supported a transversely extending shaft 18.

Referring particularly to Figure 2, there is shown at the right-hand side of the tractor and pivoted to the shaft 18 a lifting structure 19. This lifting structure 19 is connected through the links 20 with the plowing unit 15. At the opposite side of the tractor and pivoted to the transverse shaft 18 is a lifting structure 21 which is connected by depending links 22 with the left-hand plowing unit 16. These lifting structures 19 and 21 will pivot about the shaft 18 to lift the plowing units to their transport position and about the pivot point 14 on the draft structure 13.

Associated with each of the lifting structures 19 and 21 are respectively toggle latch devices 23 and 24. These latch devices are so constructed that, as the lifting structure is pivoted to raise the plowing unit to its transport position, the same will be thrown over center to effectively retain the lifting structure and place the plowing unit in a locked position. The toggle link device 23 is connected to the lifting structure 19 by means of a sleeve 25 rigidly secured as by the lifting structure 19 and on the rear end of which is connected an arm 26. As the lifting structure 19 is rotated in a clockwise direction about the shaft 18, the arm 26 will cause rearward movement of a link 27 to throw its forward end 28 over a pivot axis, which is the axis of a shaft 29 carried on a bracket 10a carried on the tractor. The forward end 28 is connected by links 30 with the pivot axis 29.

As shown in Figure 3, it will be noted that the right-hand toggle device has been thrown over center. Since the left-hand toggle device is of similar construction, the same numbers are used to designate the parts of the same. Also pivoted to the pivot shaft 29 are manually operable arms 31 accessible to the operator and having foot portions 32 adapted to engage the forward end 28 of the link 27 to throw the same rearwardly and out of its overcenter position. When this is done, the toggle link mechanism will be released and the plowing unit is automatically dropped to its working position. The right-hand toggle mechanism will then take the position of the left-hand toggle mechanism shown in Figure 3. The lifting structure 21 is similarly connected with the toggle device 24 by means of a sleeve 33 and an arm 34. Each lifting structure has a brace 35 for connecting together the lateral strap pieces forming a part of the lifting structure.

As a means for effecting operation of the lifting structures, there is provided a bail member 37 pivoted on the shaft 18. This bail member extends between the lifting structures 19 and 21 so that, as it is rotated about the shaft 18, it will engage with either lifting structure 19 or 21 or with both to thereby effect pivoting of the plowing units about the bracket structure 13 to thereby effect lifting of the plowing units to their transport position. This bail member 37 has a downwardly extending arm 38 to the lower end of which is connected a fluid-actuated device 39 anchored to the tractor, as at 40, and having a piston rod 41 adapted for connection with the arm 38. Fluid is delivered to the forward portion of the fluid device 39 by a hose coupling 42. This lifting fluid is diverted from the exhaust outlet means in the manner shown in the above-mentioned pending application. The operation of this fluid mechanism is controlled by a control rod 43 adapted to be moved fore and aft. As shown particularly well in Figure 4, it will be noted that to the rod 43 there is connected a spindle valve mechanism 44 by means of which fluid coming through a pipe 45 from the exhaust outlet means 45a of the tractor 10 is controlled in its passage to the hose coupling 42. As the control rod 43 is pulled rearwardly, a pivoted arm structure 46 is rotated in a counter-clockwise direction, as viewed in Figure 4, to cause rearward movement of a link 47 which serves to operate a valve 47a in the exhaust outlet means to cause diverting of the exhaust fluid to the pipe connection 45. This rearward movement of the control rod 43 takes place until a shoulder 48 is latched under a pressure release means 49 (see Figure 5). The pressure release means 49 includes a diaphragm 50 which, upon receiving fluid pressure from a hose coupling 51 connected with the valve 44, will cause a plunger 52 to contact with a rockable arm structure 53 pivoted at 54 to a bracket structure 55 on a steering post 56 of the tractor. A lost motion spring connection 57 serves to connect the arm structure 46 with the link 47 and this spring means 57, taken with a spring 58 connected between the tractor and the arm structure 46, will serve to maintain the shoulder portion 48 against the rockable arm structure 53 of the release means 49.

During the normal operation of the fluid-actuated device 39 having this type of control mechanism, the fluid releasable means 49 will release its arm structure 53 from the shoulder 48, and a second shoulder 60 on the rod 43 would normally engage with the bracket structure 55, thereby permitting the springs 57 and 58 to return the valve structure 44 with the aid of a spring 60a to a position where the fluid would be trapped within the fluid-actuated device 39 to thereby serve to retain the plowing units in their transport position.

But, where a fluid-actuated device is adapted for operation with a two-way plow having alternate right- and left-hand plowing units, the use of this lifting fluid to retain the plowing units is not desired. The respective toggle latch devices are provided for retaining the respective plowing units in their plowing position. Thus, as the fluid-actuated device 39 is operated, the toggle latching devices will be effected so as to render them serviceable as a means to retain the respective plowing units in their transport position. With these toggle-latching devices functioning to retain the plowing units in their transport position, there is no need for the lifting fluid to be retained in the fluid-actuated device 39.

This draining of the lifting fluid could be effected upon manually lifting the shoulder portion 60 out of engagement with the bracket 55 through which it extends, but it is preferred to have this done automatically upon the fluid cylinder having served its purpose of lifting the plowing units and of locking the toggle latch mechanism. There is, therefore, provided a guiding plate 61, through which the portion 60 rides so that it is permitted to pass through a slotted opening 55' in the bracket 55. This forward movement of the rod 43 upon the same being released from the pressure release means 49 is effected by the springs 57 and 58. Also, this forward movement of the rod 43 will cause operation of the valve 44 so as to open the fluid passage for the return of fluid from the fluid-actuated device by way of the hose coupling 42 and thence to the valve 44 and to the exhaust outlet means 45a, where the same will be exhausted to the atmosphere.

It should now be apparent that there has been provided a power lift device with features particularly adapted for the lifting of right- and left-hand plows, wherein the lifting fluid is exhausted immediately after lifting of the plowing units have been effected, so that, when the plowing units are unlocked for their return to a ground-working position, they will not be hindered in their downward movement by the delayed evacuation of the lifting fluid from the fluid-actuated device.

While various changes may be made in the detail construction of the present invention, it shall be understood that such changes shall be within the spirit and scope of the present invention as defined by the appended claims.

What is claimed is:

1. In combination, a tool-supporting structure, a working tool connected to the tool-supporting structure for vertical movement, fluid power means for lifting the working tool to its transport position and including a fluid-actuated device, means for releasably locking the working tool in its transport position, and means operable responsively to the working tool being lifted into its locked transport position to exhaust lifting fluid from the fluid device and thus condition said device so it will not trammel lowering of the tool upon subsequent release thereof by the locking means.

2. In combination, a tractor having an exhaust outlet means, a working tool connected to the tractor for vertical movement, exhaust fluid power means connected with the exhaust outlet means to receive exhaust fluid therefrom and including a fluid-actuated device connected with the working tool to lift the same, separate means for locking the working tool in its lifted position, and control mechanism operable after the lifting of the working tool to effect automatically evacuation of the lifting fluid from the fluid-actuated device when the working tool has been lifted.

3. In combination, a tool-supporting structure, a working tool connected to the tool-supporting structure for vertical movement, a fluid-actuated device for moving the working tool, control mechanism for controlling the flow of fluid to the fluid-actuated device including a valve structure, a spring biased control rod for operating the valve structure, pressure releasable means for retaining the control rod in its position for causing flow of fluid, means for normally limiting the return movement of the rod after the pressure release means has operated to effect cessation of the flow of fluid, separate means for locking the working tool in its transport position, and means for altering the limiting means to permit complete return of the control rod to thereby effect automatically evacuation of the lifting fluid from the fluid-actuated device after the working tool has been lifted.

4. In combination, a tractor, right-hand and left-hand plowing units connected to the tractor for alternate operation, fluid power means for lifting either one or both of the plowing units to a transport position, separate means for locking the plowing units in their transport positions, and means operable in timed relation with the lifting of said plowing units for evacuating fluid from the fluid power means upon the lifting of said units into their locked transport position, whereby said plowing units may be released from their transport position at a later time without attention to the release of the lifting fluid.

5. In combination, a tractor having an exhaust outlet means, right-hand and left-hand plowing units connected to the tractor for alternate operation, exhaust fluid power connected with the exhaust outlet means to receive exhaust fluid therefrom and including a fluid-actuated device for lifting either one or both of the plowing units to a transport position, separate means for locking each of the plowing units in their transport positions, and control mechanism operable after the lifting of either or both of the plowing units to their transport positions to effect automatically evacuation of the lifting fluid from the fluid-actuated device when the working tool has been lifted, whereby said plowing units may be released from their transport position at a later time without previous release of the lifting fluid.

6. In combination, a tractor having an exhaust outlet means, right-hand and left-hand plowing units connected to the tractor for alternate operation, exhaust fluid power means connected with the exhaust outlet means to receive exhaust fluid therefrom and including a fluid-actuated device for lifting either one or both of the plowing units to a transport position, separate means for locking each of the plowing units in their transport positions, control mechanism for controlling the flow of fluid to the fluid-actuated device including a valve structure, a spring biased control rod for operating the valve structure, pressure releasable means for retaining the control rod in its position for causing flow of fluid, means for normally limiting the return movement of the rod after the pressure release means has operated to effect cessation of the flow of fluid, and means for altering the limiting means to permit complete return of the control rod to thereby effect automatically evacuation of the exhaust lifting fluid from the fluid-actuated device after the plowing unit or units have been lifted, whereby said plowing units may be released from their transport position at a later time without previous release of the lifting fluid.

CARL W. MOTT.